(12) United States Patent
Emerich et al.

(10) Patent No.: US 8,362,404 B2
(45) Date of Patent: Jan. 29, 2013

(54) OPEN WARMING CABINET

(75) Inventors: Paul M. Emerich, Cary, IL (US); Gregory T. Landeweer, Northbrook, IL (US)

(73) Assignee: Carter Hoffmann, Inc., Mundelein, IL (US)

( * ) Notice: Subject to any disclaimer, the term of this patent is extended or adjusted under 35 U.S.C. 154(b) by 334 days.

(21) Appl. No.: 12/781,354

(22) Filed: May 17, 2010

(65) Prior Publication Data

US 2011/0278278 A1 Nov. 17, 2011

(51) Int. Cl.
*A47J 39/00* (2006.01)
*F27D 7/04* (2006.01)

(52) U.S. Cl. .................... 219/400; 99/483; 126/21 A

(58) Field of Classification Search .............. 219/400; 99/483; 126/21 A
See application file for complete search history.

(56) References Cited

U.S. PATENT DOCUMENTS

| | | |
|---|---|---|
| 2,949,524 A | 8/1960 | Scarioni |
| 3,313,917 A | 4/1967 | Ditzler |
| 3,628,447 A | 12/1971 | Levenback |
| 3,817,160 A | 6/1974 | Searcy |
| 3,942,426 A | 3/1976 | Binks |
| 3,957,326 A | 5/1976 | Molitor |
| 4,038,968 A | 8/1977 | Rovell |
| 4,381,442 A | 4/1983 | Guibert |
| 4,381,443 A | 4/1983 | Guibert |
| 4,437,396 A | 3/1984 | Plattner et al. |
| 4,455,478 A | 6/1984 | Guibert |
| 4,835,351 A | 5/1989 | Smith |
| 4,850,120 A | 7/1989 | Stein |
| 5,276,309 A | 1/1994 | Hasse et al. |
| 5,402,654 A * | 4/1995 | Rudick et al. ............ 62/448 |
| 5,532,456 A | 7/1996 | Smith et al. |
| 5,771,788 A * | 6/1998 | Lee et al. ............... 99/468 |
| 5,880,434 A | 3/1999 | Pinnow et al. |
| D411,073 S | 6/1999 | Ewald et al. |
| 6,114,659 A | 9/2000 | Finck |
| 6,175,099 B1 | 1/2001 | Shei et al. |
| 6,209,447 B1 | 4/2001 | Ewald et al. |
| 6,369,362 B1 | 4/2002 | Brenn |
| 6,384,380 B1 | 5/2002 | Faires et al. |
| 6,742,344 B2 | 6/2004 | Vormedal |
| 7,012,218 B2 | 3/2006 | Flinn |
| 7,105,779 B2 | 9/2006 | Shei |
| 7,137,438 B2 | 11/2006 | Nomura et al. |
| 7,220,946 B2 | 5/2007 | Majchrazak et al. |
| 7,227,102 B2 | 6/2007 | Shei |

(Continued)

*Primary Examiner* — Alexander Ghyka
(74) *Attorney, Agent, or Firm* — Brinks Hofer Gilson & Lione

(57) ABSTRACT

A container configured to establish an air flow curtain at an open end thereof is provided. The container includes a housing defining an internal volume with opposed five mutually perpendicular walls and an open end allowing access to the internal volume. A heater and a fan are disposed within the housing. An assembly is removably positioned within the internal volume of the housing and configured to be removed from the internal volume in a single motion without any external tools, the assembly comprises five mutually perpendicular walls and an open end allowing access to an internal volume within the assembly. When the assembly is positioned within the housing, a first plenum is defined within a space between the rear wall of the assembly and the rear wall of the housing, and a second plenum in fluid communication with the first plenum is defined within a space between the lower wall of the assembly and the rear wall of the housing. An outlet of the second plenum urges air flowing therethrough across the combined open ends of the housing and the assembly.

15 Claims, 6 Drawing Sheets

U.S. PATENT DOCUMENTS

| | | |
|---|---|---|
| 7,328,654 B2 | 2/2008 | Shei |
| 7,328,730 B2 * | 2/2008 | Vilalta et al. .................. 141/326 |
| RE40,290 E | 5/2008 | Shei |
| 7,866,171 B2 * | 1/2011 | Cho et al. ......................... 62/127 |
| 8,134,101 B2 * | 3/2012 | Majchrzak .................... 219/400 |
| 2002/0005686 A1 | 1/2002 | Nuttall et al. |
| 2002/0100752 A1 | 8/2002 | Brenn |
| 2005/0103212 A1 | 5/2005 | Cronin et al. |
| 2005/0211109 A1 * | 9/2005 | Majchrzak et al. ............. 99/468 |
| 2006/0027586 A1 * | 2/2006 | Longhany et al. ............. 220/676 |
| 2008/0168795 A1 * | 7/2008 | Alfille ......................... 62/457.9 |
| 2008/0284296 A1 | 11/2008 | Nuttall et al. |
| 2009/0045153 A1 | 2/2009 | Vesser et al. |
| 2009/0095727 A1 * | 4/2009 | Majchrzak .................... 219/385 |
| 2010/0186423 A1 * | 7/2010 | Veltrop et al. .................... 62/3.6 |
| 2011/0277489 A1 * | 11/2011 | Schalla et al. ..................... 62/89 |

* cited by examiner

OPEN WARMING CABINET

TECHNICAL FIELD

This disclosure relates to the field of containers and cabinets that are configured to hold and maintain pre-cooked food product items warm and moist for later use by a kitchen or restaurant facility.

BRIEF SUMMARY

A first representative embodiment of the disclosure is provided. The first representative embodiment is a heated food storage container that includes a housing forming an open internal volume with upper and lower walls, right and left walls, and a rear wall in combination defining the internal volume accessible through an open front portion. A heater and a fan are disposed within the housing and configured to deliver a flow of heated air within the internal volume. A combined rack and ventilation assembly is provided. The assembly comprises upper and lower walls, right and left walls, and a rear wall that in combination define a second internal volume accessible through an open front portion. The assembly may be disposed within the internal volume of the housing and the assembly is configured to be removed from the internal volume of the housing without any external tools. A ventilation path within the container is formed when the assembly is positioned within the housing, the ventilation path is disposed within a first plenum defined between the respective rear walls of the assembly and housing and continuing to a second plenum defined between the respective lower walls of the assembly and housing.

A second representative embodiment of the disclosure is provided. The second representative embodiment is a container that is configured to establish an air flow curtain at an open end thereof. The container includes a housing defining an internal volume with opposed upper and lower walls, opposed right and left walls, and a rear wall opposing the open end. A heater and a fan are each disposed within the housing. An assembly is removably positioned within the internal volume of the housing and is configured to be removed from the internal volume in a single motion without any external tools. The assembly comprises a plurality of walls comprising opposed upper and lower walls, opposed right and left walls, and a rear wall opposing an open end of the assembly, the plurality of walls of the assembly defining a second internal volume accessible through the open end. When the assembly is positioned within the housing, a first plenum is defined within a space between the rear wall of the assembly and the rear wall of the housing, and a second plenum in fluid communication with the first plenum is defined within a space between the lower wall of the assembly and the rear wall of the housing. An outlet of the second plenum urges air flowing therethrough across the combined open ends of the housing and the assembly.

A third representative embodiment of the disclosure is a container for storing a heated food product within an open internal volume therein. The container includes a housing that encloses the internal volume that is accessible through an open end at a front portion thereof. A heater and fan are disposed within the housing to urge a continuous flow of heated air through the housing. An assembly may be removably inserted within the housing and is configured to support one or more pans of food within the internal volume and is also configured to in combination with the walls of the housing guide the continuous flow of heated air around the housing and internal volume, and establish a curtain of heated air across the open end of the housing. The assembly may be withdrawn from the housing in a single motion without any external tools, and the assembly may be reinstalled within the housing in a second single motion without any external tools.

Advantages of the disclosed container will become more apparent to those skilled in the art from the following description of embodiments that have been shown and described by way of illustration. As will be realized, other and different embodiments are contemplated, and the disclosed details are capable of modification in various respects. Accordingly, the drawings and description are to be regarded as illustrative in nature and not as restrictive.

BRIEF DESCRIPTION OF THE DRAWINGS

FIG. 6 is an exploded view of the components defining the container of FIG. 2 with the assembly shown removed from the container.

DETAILED DESCRIPTION OF THE DRAWINGS AND THE PRESENTLY PREFERRED EMBODIMENTS

Figure 1:
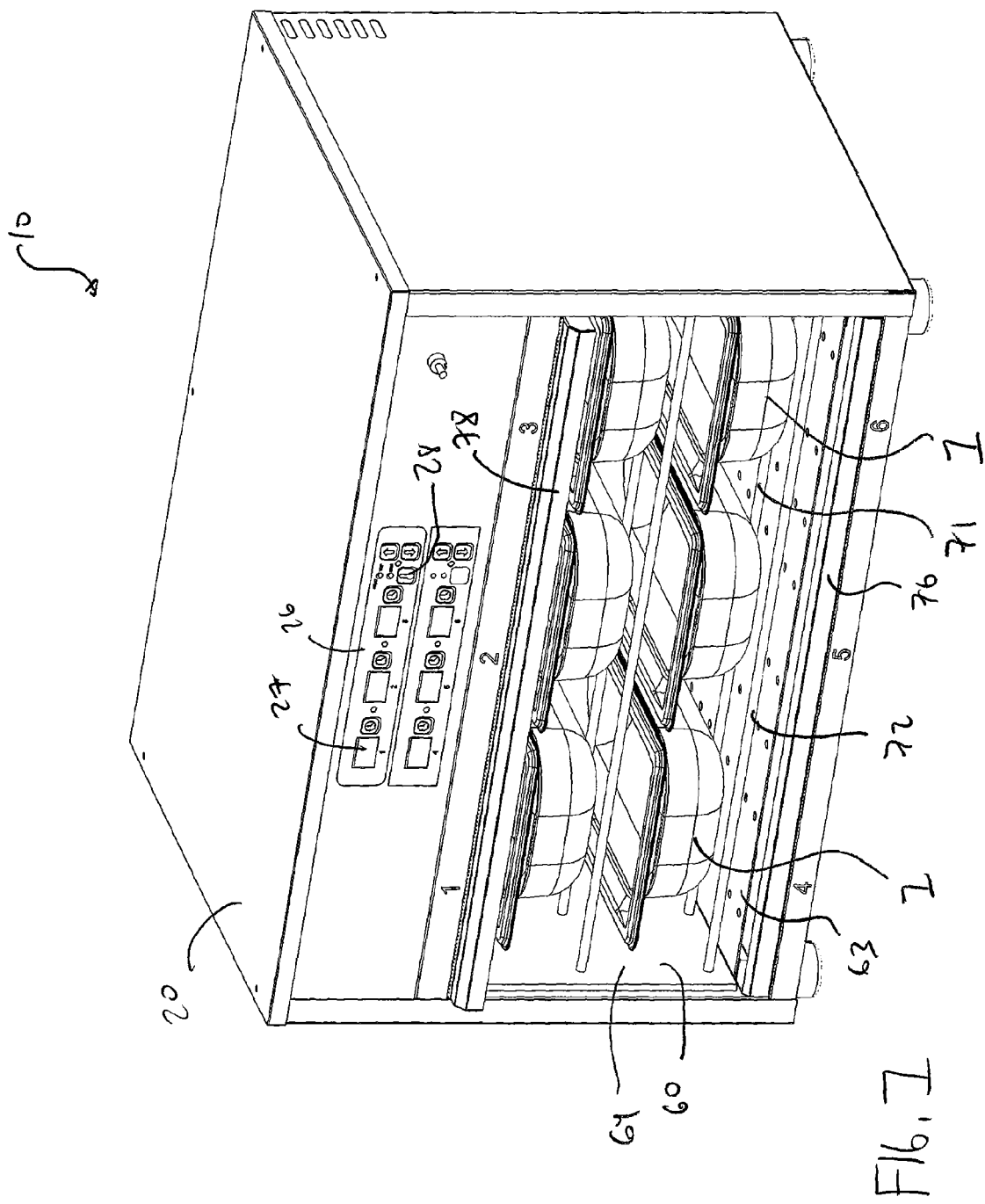
FIG. 1 is a perspective view of a food storage container showing a plurality of pans disposed within an internal volume of the housing of the container.
Figure 2:
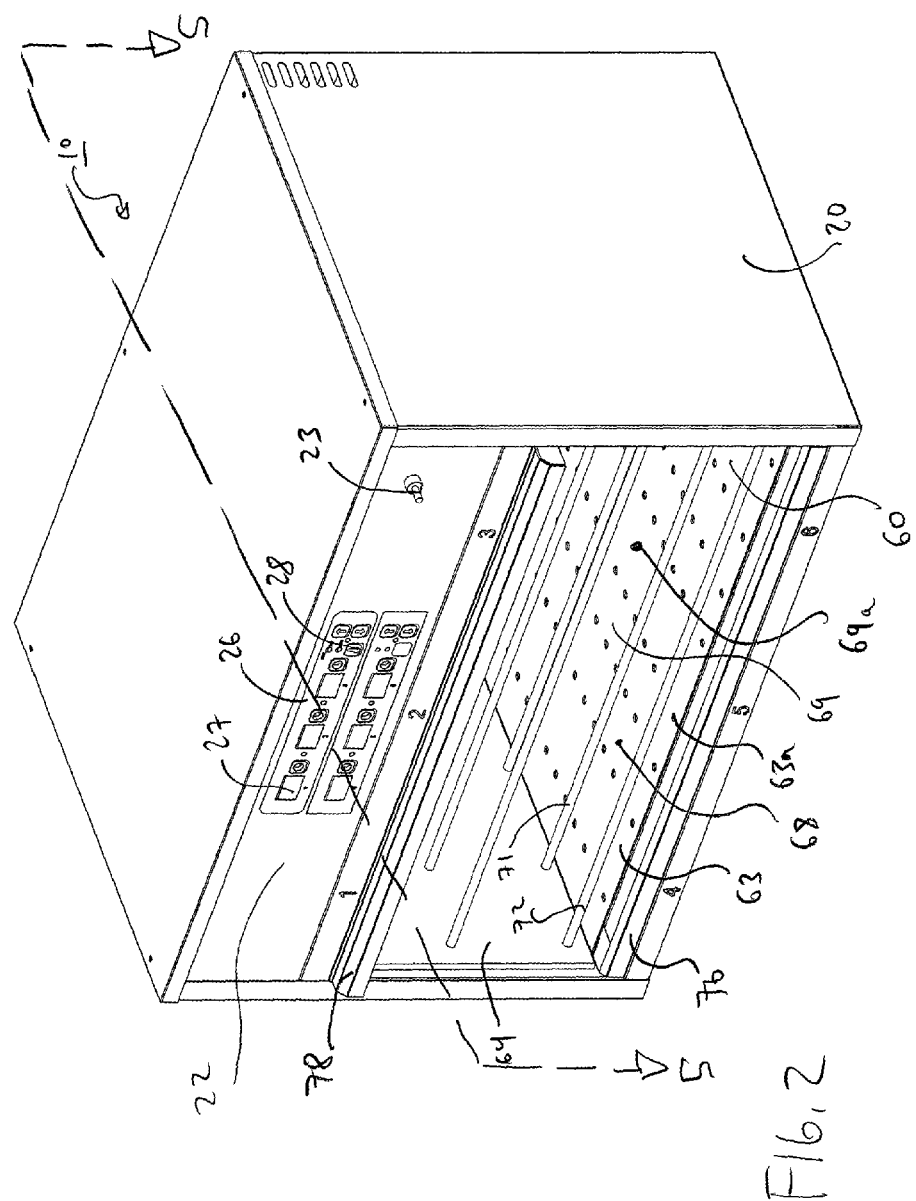
FIG. 2 is the view of the container of FIG. 1 with the plurality of pans removed.

Turning now to FIGS. 1-6, a heated food storage container, or cabinet 10 is provided. The container 10 is configured to receive and support multiple food storage trays within an internal volume 69 therein. In some embodiments, the container 10 may be capable of storing two conventional restaurant pans therein, each disposed upon a separate vertically separated rack. The container 10 may alternatively receive and store multiple smaller pans within the internal volume such as two half pans per rack, or three one-third sized pans 1 on each rack, as shown in FIG. 1. In some embodiments the container 10 may be configured to sit upon a counter or other structure within a commercial kitchen or restaurant, while in other embodiments the container 10 may be configured to be able to be conveniently moved around the kitchen or facility with a plurality of castors or the like. The container 10 may be of a size to be conveniently accessed when sitting upon a counter, or may be of a larger size to rest (or move) upon the floor, similar to a larger banquet food holding cabinet.

The container 10 provides a flow of heated air within the internal volume 69 to maintain the temperature of the food products disposed within the pans 1, as well as a curtain of heated air that flows through a front opening 68 into the internal volume 69 of the container 10. The air curtain 68 establishes a barrier between the heated internal volume 69 and the environment. The flow of heated air that establishes the air curtain across the front opening 68 as well as the flow of heated air that flows through the internal volume 69 of the container 10 is created by one or more fans 24 and one or more heating elements 25 (either electric or gas) that may be disposed within a partially enclosed mechanical compartment 26 of the container 10, or otherwise disposed within the container 10 to limit the possibility of personal injury due to unintended contact with the fans 25 and/or the heating elements 24.

The container 10 includes a housing 20 that is fixed within the container 10 and supports both the mechanical compartment 26, normally disposed in an upper portion of the container 10 above the upper portion 41 of the housing 20, and a removable assembly, or caddy 60 that may be disposed within the internal volume 69 of the housing 20 and may be removed from the housing 20 in a single motion and without the use of any external tools.

With reference to FIG. 6, the housing 20 is defined from opposite upper and lower walls 41, 43, opposite right and left walls 42, 44, and a rear wall 45, opposite an open end 46 to allow access to the internal volume 69. The housing 20 is disposed within the container 10 to define the internal volume 69 of the container 10 and is sized to closely receive the assembly 60 therein. Specifically, the spacing between the right and left walls 42, 44 of the housing may be just larger than the spacing between the right and left walls 62, 64 of the assembly 60 to minimize the gap between the side walls of the assembly 60 and the housing 20 to minimize the overall footprint of the container 10.

The upper wall 41 of the housing 20 may be configured with one or more apertures (that may be provided with grates) that provide a suction path for air flowing through one or more fans 25 that are disposed within the mechanical compartment 26 of the container 10. The one or more fans 25 are mounted to the upper wall 41 (and the mechanical compartment 26 is configured) to urge a flow of air toward the rear wall 45 of the housing 20 when the fans 25 are in operation. As discussed elsewhere herein, the one or more heating elements 24 are disposed in conjunction with the fans to transfer heat to the air flowing through the fans within the mechanical compartment 26.

Figure 3:
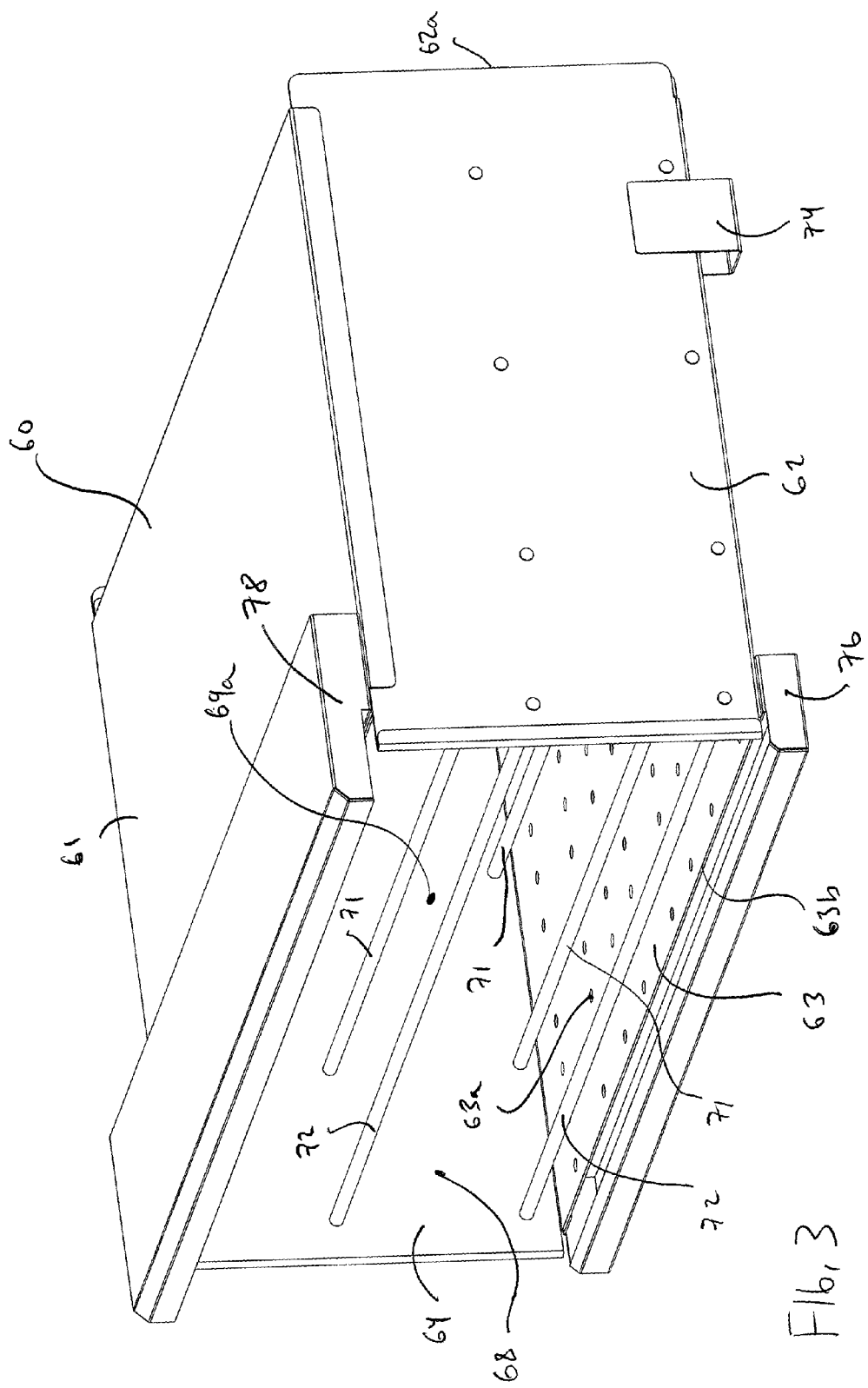
FIG. 3 is a front perspective view of an assembly insertable within the internal volume of the housing.
Figure 4:
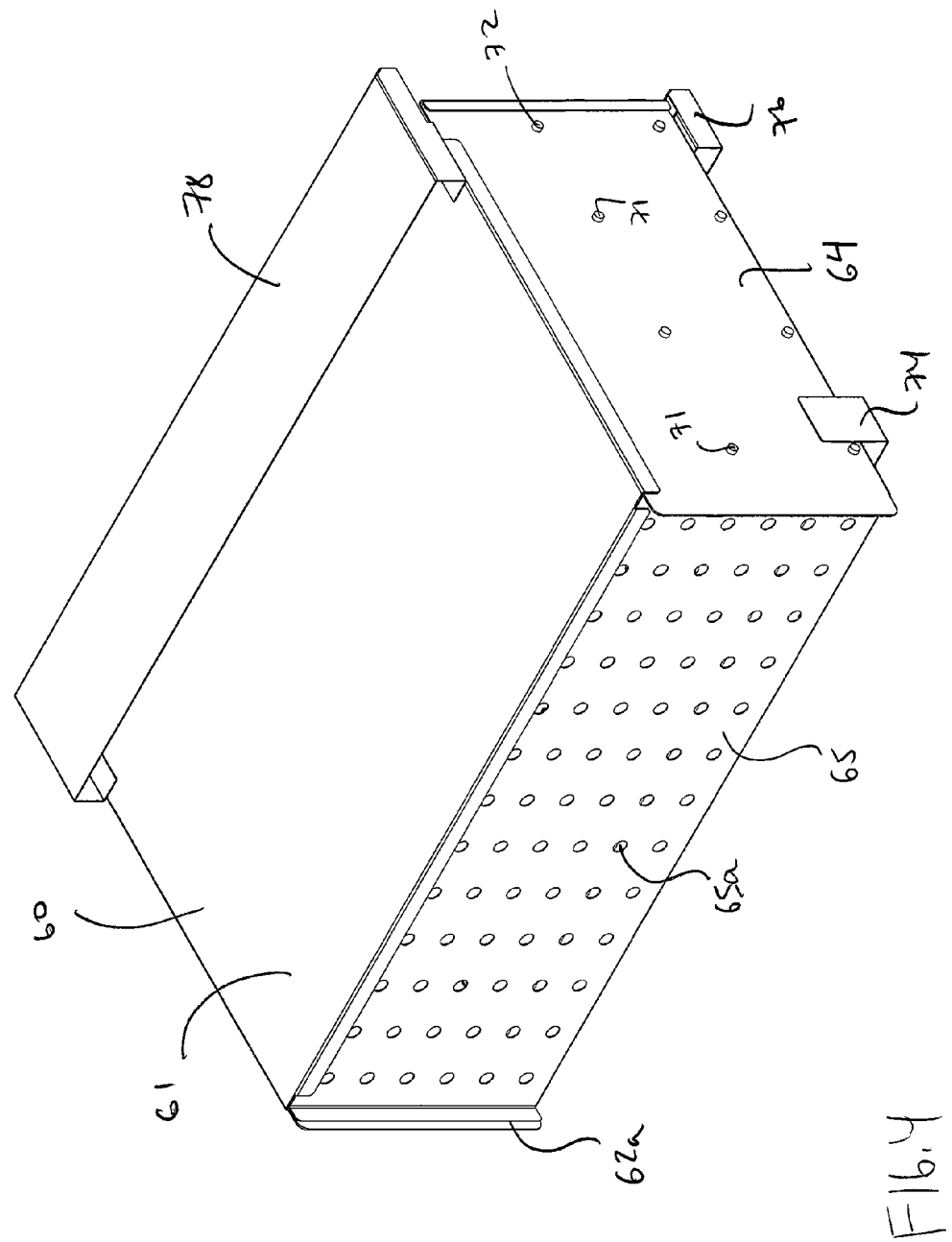
FIG. 4 is a rear perspective view of the assembly of FIG. 3.

The assembly 60 may be formed as a single unit that may be installed into and removed from the internal volume 69 of the housing 20 in a single motion and without the use of any external tools. The assembly is a single unit that is configured to support a plurality of pans within its internal volume 69a upon one or more racks and additionally in combination with the housing guides a continuous flow of air established by one or more fans 25. As shown in FIGS. 3-4, the assembly 60 is defined from opposed upper and lower walls 61, 63, opposed right and left walls 62, 64, and a rear wall 65 that opposes on open front end 68 that allows access into the internal volume 69a of the assembly 60. The right and left walls 62, 64 support two or more racks in a vertically spaced relationship. The racks may be formed from a plurality of rods 71 that are spaced from each other along a constant height (as shown schematically in FIG. 5 as line H). In some embodiments, a rod 72 disposed most proximate to the open end 68 of the assembly 60 may be slightly higher than the remaining rods 71, to prevent the one or more pans 1 disposed thereon from inadvertently sliding out of the internal volume 69a through the open end 68 of the assembly 60 (as shown schematically by line G in FIG. 5).

Figure 5:
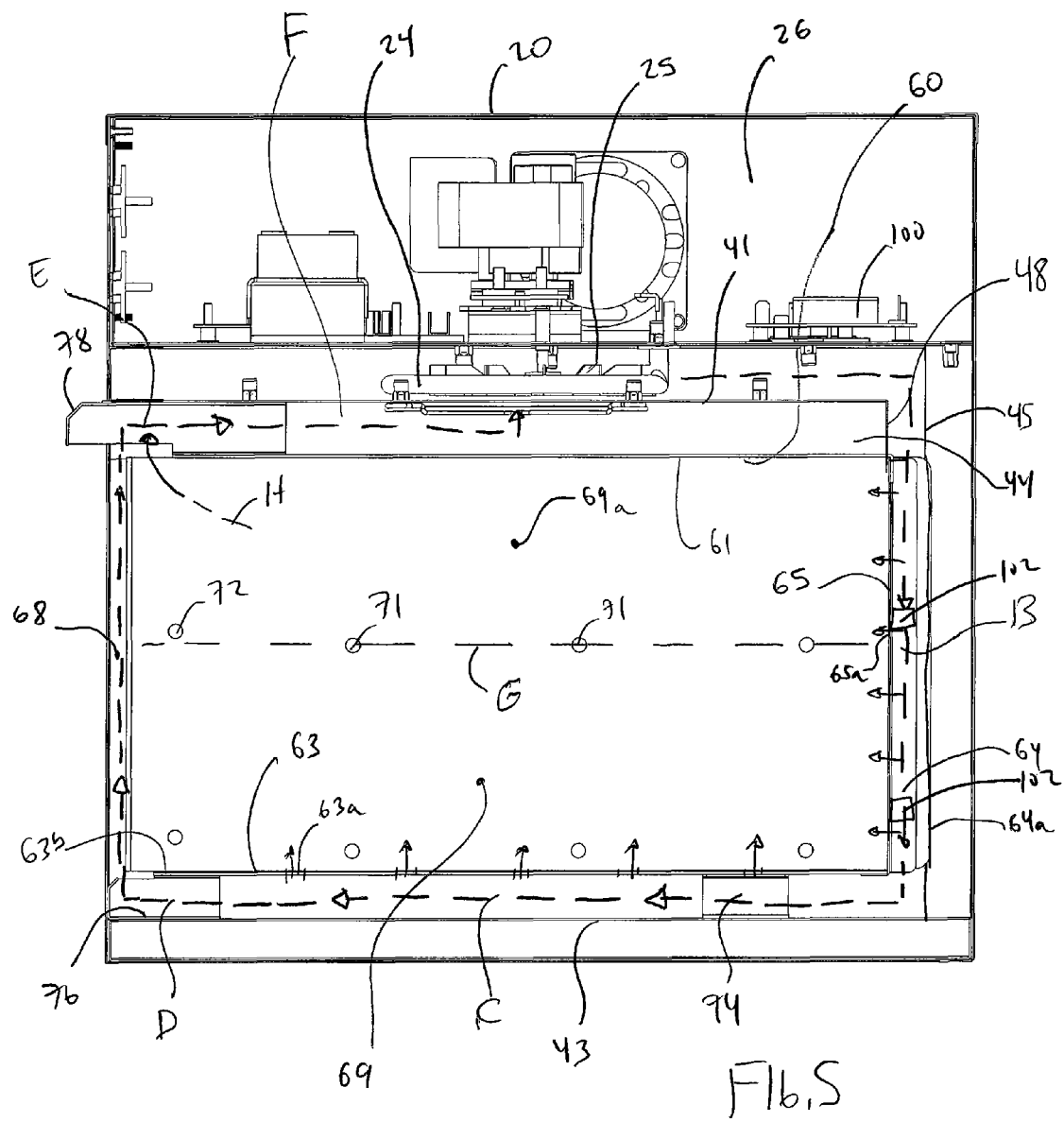
FIG. 5 is a section view of the food storage container of FIG. 2 about section 5-5 shown in FIG. 2.
Figure 9:
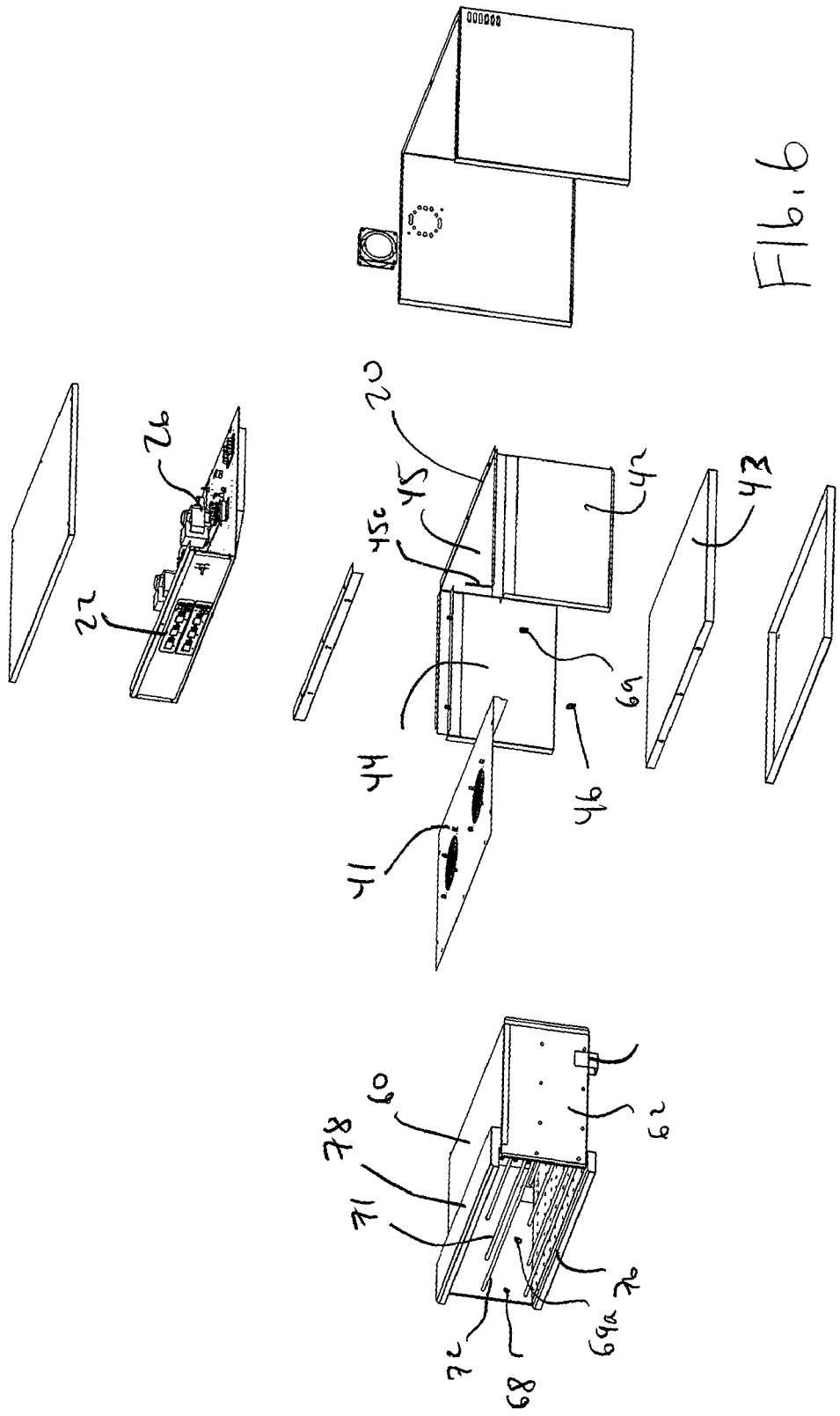

As best understood with reference to FIG. 5, the assembly 60 is configured and sized to create three substantial gaps between the outer surface of the assembly 60 and the inner surface of the housing 20, which defines a ventilation path between the assembly 60 and the housing 20. The assembly 60 includes two or more feet 74 that extend downwardly from the lower wall 63, and a lower deflector 76 that is fixed to the front edge 63b of the lower wall and additionally extends below the lower wall 63 substantially the same distance as the feet 74. The space established below the assembly 60 and above the lower wall 43 of the housing 20 establishes the second plenum C of the ventilation path, the operation of which is discussed below.

The right and left walls 62, 64 of the assembly 60 connect with and extend rearwardly of the rear wall 65 of the assembly 60. As best understood with reference to FIG. 5, the assembly 60 may be inserted within the housing 20 until the rear edges 62a, 64a of the right and left walls, respectively, contact the rear wall 45 of the housing 20. The gap formed between the rear wall 65 of the assembly 60 and the rear wall 45 of the housing 20 (substantially equal to the distance the right and left walls 62, 64 extend rearwardly of the rear wall 65 of the assembly 60) establishes the first plenum B of the ventilation path, the operation of which is discussed below. As shown in FIG. 5, the first and second plenums B, C are in fluid communication with each other allowing flow of air passing through the first plenum B to enter the second plenum C.

An upper plenum F of the ventilation path is established between the upper wall 61 of the assembly 60 and the upper wall 41 of the housing 60. The upper plenum F is in fluid communication with the suction side of one or more fans 25, urging air within the upper plenum F into and through the one or more fans 25. The discharge of the one or more fans 25 (normally located within the mechanical compartment 26) is in fluid communication with the first plenum B, with operation of the one or more fans 25 urging continuous air flow through the first plenum B, and around the entire ventilation path to return to the suction of the one or more fans 25.

The lower deflector 76 is disposed upon the forward edge 63b of the lower wall 63 and receives air flowing through the second plenum C therein. The lower deflector 76 establishes the third plenum D of the ventilation path and redirects air received within the lower deflector 76 to flow across the open end 68 of the assembly 60 (and therefore also across the open end 46 of the housing 20 receiving the assembly 60). The flow of air across the open end 68 aids in the prevention of heat loss from within the interior volume 69a of the assembly 60 and additionally prevents foreign matter from the environment around the container 10 from entering the internal volume 69a and interacting with the food product disposed within the internal volume 69a.

An upper deflector 78 is disposed upon the front portion of the upper wall 61 of the housing 60 and is configured to establish the fourth plenum E of the ventilation path and receive air traveling as an air curtain through the open end 68 of the assembly 60 and redirect that air into the upper plenum F for eventual flow thorough the one or more fans 25. Accordingly, the combined first, second, third, fourth, and upper plenums B, C, D, E, F provide for a substantially closed loop of heated air to flow through the housing 20 during operation of the one or more fans 25. The combination of the lower and upper deflectors 76, 78 urges air through the open end 68, which minimizes heat loss to the environment because the air leaving through the open end 68 is minimized. In some embodiments, the housing 20 may include a direction wall 48 (FIG. 5) which urges air flowing from the discharge of the one or more fans 25 into the first plenum B. The housing 20 may additionally include shaped baffles that are configured to similarly urge air from the one or more fans 25 to the first plenum B while minimizing resistance of air flow to the first plenum B.

As shown in FIGS. 3 and 4, each of the lower wall 63 and the rear wall 65 of the assembly 60 may include a plurality of apertures 63a, 65a that allow fluid communication from the second and first plenums C, B, respectively, into the internal volume 69a of the assembly 60. The flow of heated air directly into the internal volume 69a provides for a flow of heated air directly past the outer surface of the pans 1 disposed within the internal volume 69a, as well as air flowing past the open tops of the pans 1. This flow of air past the pans, adds heat to the food products disposed within the pans 1 to replace heat from the food product lost to the environment. Further, the heated air flow over the pans 1 minimizes the drying out of the food product disposed therein, as would occur if there were no air flow across the pans 1.

The number and size of apertures 63a, 65a are configured to supply sufficient heated air within the internal volume to avoid cool down and dryout, but additionally establishes a flow rate of heated air through the internal volume 69a that is less than the flow rate of heated air in the curtain across the open end 68 of the assembly 60. The larger flow of heated air along the air curtain than through the internal volume 69a of the assembly minimizes the turbulence of flow at the top portion of the air curtain where air from the internal volume 69a enters the upper deflector 78 and the fourth plenum E (as urged thereto by the relatively lower pressure proximate to the suction of the one or more fans 25) from both the air curtain and inner volume 69a (shown schematically as H in FIG. 5). If the flow rate through the air curtain was lower in comparison with the flow rate through the internal volume 69a, a large turbulent flow would be created where the two flows intersect, which could minimize the effectiveness of the air curtain.

Further, because heat loss to the environment through the open end 68 is minimized by the flow of the air curtain, as well as the fact that hot air flowing through the various plenums above and below the assembly 60 surrounds the internal volume, heat loss from the internal volume 69a is minimized, limiting the need for air flowing through the internal volume to replace heat lost from the food product disposed therein is minimized and therefore limiting the amount of heated air needed to flow within the internal volume 69a.

In some embodiments, a controller 100 may be provided to maintain the temperature of the air flowing through the ventilation system. The controller may include one or more temperature sensors, such as a thermistors, thermocouple, or the like, and may operate to vary the heat input to the heating elements 24 and/or the speed of the one or more fans 25 based upon the temperature of the air flowing therethrough. In some embodiments, the controller includes an input 28 accessible by the user upon a display section 22 of the container 10, which allows the user to select the desired temperature of air flowing within the housing 20, with the controller modifying the heating elements 24 and/or fan 25 accordingly. In other embodiments, the controlled temperature may be factory set, or may controlled with one or more infinite switches.

In some embodiments, the container 10 may include multiple timers upon the display section 26 that each include a display easily read by the user. The multiple timers 27 are provided for the user to be able to independently track the hold time of several different pans disposed within the internal volume 69a of the assembly 60. The timers 27 may provide an indication of the hold time (both visual with a countdown or count up display, and/or audible with programmable alarms associated with each timer), and may additionally provide an input to the controller 100, causing the controller to modify the operation of one or both the heating elements 24 and the fan 25 based upon the operation of the timers 27.

In some embodiments, the container 10 may include an interlock (either as a part of the controller 100, or as its own component or system) that prevents one or both of the one or more fans 25 and the heating elements 24 from operating when the assembly 60 is not properly positioned within the housing 20. In some embodiments, the interlock may operate by allowing or preventing power flow to one or both of the heating elements 24 and fan 25, while in other embodiments the interlock may provide an input to the controller, which in turn operates one or both of the heating elements 24 and fan 25. The interlock may include one or more mechanical or electrical sensing elements that form an input, with the sensing elements configured to "see" when the assembly 60 is properly positioned. The sensing elements may be mechanical, such as a switch 102 (FIG. 5) that is moved from a normal position when the assembly 60 is not properly positioned and movable to a second position as urged by the assembly 60 when properly positioned. The switch 102 position may be electrically determined (such as due to a change in magnetism, resistance, capacitance or the like as the switch 102 position changes) and a signal is sent to the controller to allow operation of the fan 25 and/or the heating elements 24 when the assembly 60 is properly positioned. Alternatively, the switch 102 is mechanically connected to a relay that operates one or more electrical contacts in power circuit for one or more of the heating elements 24 and fan 25. The input may alternatively be an electrical or electrical mechanical device that is either in communication with a controller or directly operates a switch within the power circuit for one or both of the heating elements 24 and fan 25.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

The invention claimed is:

1. A heated food storage container, comprising:
    a housing forming an open internal volume with upper and lower walls, right and left walls, and a rear wall in combination defining the internal volume accessible through an open front portion;
    a heater and a fan disposed within the housing and configured to deliver a flow of heated air within the internal volume;
    a combined rack and ventilation assembly comprising upper and lower walls, right and left walls, and a rear wall in combination defining a second internal volume accessible through an open front portion, wherein the assembly may be disposed within the internal volume of the housing and the assembly is configured to be removed from the internal volume of the housing without any external tools,
    wherein a ventilation path within the container is formed when the assembly is positioned within the housing, the ventilation path disposed within a first plenum defined between the respective rear walls of the assembly and housing and continuing to a second plenum defined between the respective lower walls of the assembly and housing.

2. The container of claim 1, wherein the assembly further comprises a third plenum in fluid communication with the second plenum, wherein the third plenum extends from the lower wall of the assembly and directs air entering the third plenum from the second plenum across the open front portion of the assembly.

3. The container of claim 1, wherein rear edges of each of the right and left walls of the assembly extend rearwardly beyond the rear wall of the assembly such that contact between the rear edges of one or both of the right and left walls of the assembly with the rear wall of the housing defines a distance between the rear wall of the assembly and the rear wall of the housing to establish the first plenum.

4. The container of claim 2, wherein the assembly further comprises two or more downwardly extending feet disposed proximate a rear end of the lower wall of the assembly, wherein the feet are configured to define a distance between the lower walls of the assembly and housing to establish the second plenum.

5. The container of claim 4, wherein the assembly further comprises a third plenum in fluid communication with the second plenum, wherein the third plenum extends from the lower wall of the assembly and directs air entering the third plenum from the second plenum across the open front portion of the assembly, wherein at least a portion of the third plenum extends below the lower wall of the assembly substantially the same distance as the distance between lower walls of the assembly and the housing.

6. The container of claim 2, wherein the assembly further comprises a fourth plenum disposed upon the upper wall, wherein the fourth plenum is configured to receive air flowing across the open front portion of assembly and direct the received air into the housing.

7. The container of claim 6, wherein the heater and the fan are disposed within a partially enclosed volume within the housing, with the partially enclosed volume comprising a first opening configured to receipt of air from the fourth plenum on a suction side of the fan, and a second opening configured to allow fluid communication from a discharge side of the fan into the first plenum.

8. The container of claim 1, wherein the assembly includes a plurality of horizontal rods that extend between the right and left walls through the second internal volume.

9. The container of claim 8, wherein a first portion of the plurality of rods are disposed at substantially the same height within the second internal volume while a rod of the plurality of rods closest to the front opening is disposed at a height slightly above the height of the remainder of the plurality of rods.

10. The container of claim 1, wherein the rear and lower walls of the assembly each include a plurality of holes disposed therein that allow fluid communication therethrough into the second internal volume from the first and second plenums, respectively.

11. The container of claim 1, further comprising an interlock that includes an input configured to determine whether the assembly is properly positioned within the housing, wherein the interlock selectively allows electrical power to at least one of the heater and the fan when the input determines that the assembly is properly positioned within the housing and selectively prevents electrical power to at least one of the heater and the fan when the input does not determine that the assembly is properly positioned within the housing.

12. The container of claim 1, wherein at least one of the heater and the fan are operatively engaged with a controller configured to control operation of at least one of the fan and heater to maintain temperature within the internal volume.

13. The container of claim 1, further comprising two or more separately operable timers disposed upon the housing.

14. The container of claim 1, wherein the assembly is a single component that can be removed from the housing in a single operation.

15. The container of claim 1, wherein the internal volume of the housing is accessible through the front opening of the housing when the assembly is removed from the housing.

* * * * *